UNITED STATES PATENT OFFICE.

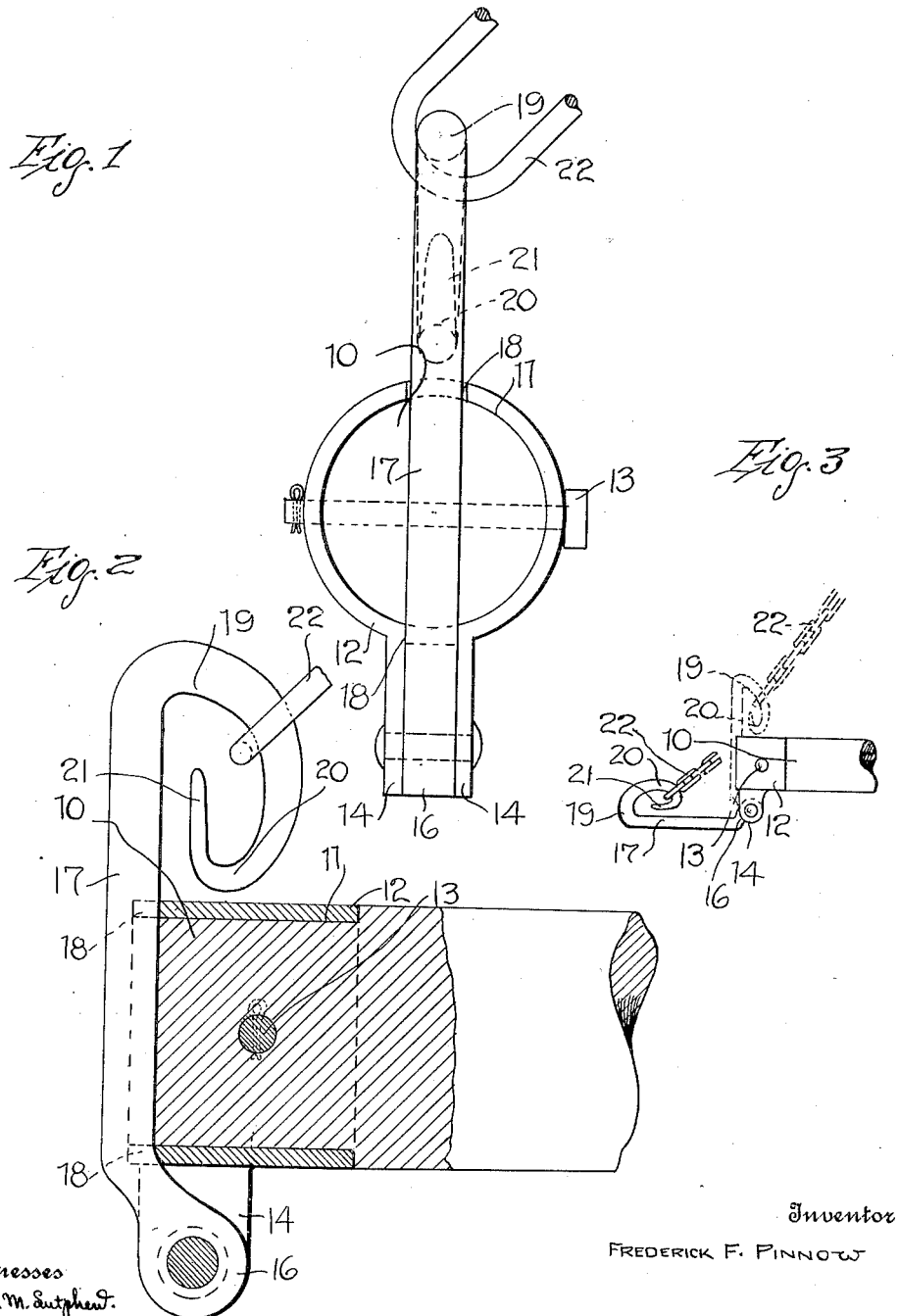

FREDERICK F. PINNOW, OF BRODHEAD, WISCONSIN, ASSIGNOR OF ONE-HALF TO LEWIS W. TERRY, OF BRODHEAD, WISCONSIN.

WHIFFLETREE-HOOK.

1,097,670.  Specification of Letters Patent.  Patented May 26, 1914.

Application filed April 5, 1913. Serial No. 759,119.

*To all whom it may concern:*

Be it known that I, FREDERICK F. PINNOW, a citizen of the United States, residing at Brodhead, in the county of Green and State of Wisconsin, have invented certain new and useful Improvements in Whiffletree-Hooks, of which the following is a specification, reference being had to the accompanying drawings.

This invention comprehends certain new and useful improvements in swingletree hooks, and the invention has for its primary object an improved construction of a device of this character, by the use of which the trace chains or similar draft devices may be readily secured into position and detached and when applied will be locked as against accidental displacement, and the invention also aims to generally improve devices of this character so as to render them more useful and commercially desirable.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawing, in which—

Figure 1 is an end view of a swingletree hook constructed in accordance with my invention; Fig. 2 is a longitudinal sectional view of the device in applied position; and Fig. 3 is a side elevation.

Corresponding and like parts are referred to in the following description and designated in the different views of the accompanying drawing by corresponding reference characters.

Referring to the drawing, the numeral 10 designates generally the end of a swingletree, which is reduced at its extremity to receive the ferrule 12, the same being securely held thereon by any suitable fastening means, as shown at 13, which indicates a locking pin passing through the opposite sides of the ferrule 12 and through the swingletree. The ferrule 12 is formed with a pair of spaced parallel ears 14, between which is pivoted the flattened terminal 16 of a shank 17. The ferrule 12 is provided with diametrically opposed notches 18 formed in its sides for the reception of the shank 17. The relatively free end of the shank 17 is curved inwardly, as indicated at 19, to a point contiguous to the side of the ferrule 12 when the hook is in its operative position, and is then returned upon itself to form the bill 21 of a hook for the reception of the trace chain or cock-eye indicated at 22. The links of the chain 22 are of a thickness greater than the space between the ferrule 12 and the hook which prevents the passage of the chain therethrough. When it is desired to apply the chain 22 to the hook, the shank 17 is swung outwardly to the full line position illustrated in Fig. 3, whereupon the chain may be readily inserted in the hook. The shank is then swung inwardly until it rests in the notches 18 of the ferrule and the chain or other draft device is thus held against any accidental displacement.

While the accompanying drawing illustrates what I believe to be the preferred embodiment of my invention, it is to be understood that the invention is not limited thereto, but that various changes may be made in the construction, arrangement and proportions of the parts without departing from the scope of the invention as defined in the appended claim.

Having thus fully described this invention what I claim and desire to protect by Letters Patent is:

In a whiffletree hook, the combination with a whiffletree; of a ferrule mounted on the end thereof and having one circular edge projecting beyond the edge of the whiffletree and provided with diametrically opposite notches, said ferrule being also provided with a pair of radially projecting ears near its extended circular edge and adjacent one of the notches, a shank having an offset end pivoted between said ears, the body of the shank being normally engaged in the diametrically opposite notches and against the end of the whiffletree, and a hook formed on the free end of the shank for the reception of a trace chain.

In testimony whereof I hereunto affix my signature in the presence of two witnesses.

FREDERICK F. PINNOW.

Witnesses:
 FRANK JENKS,
 BURR SPRAGUE.